United States Patent [19]

Lapp et al.

[11] Patent Number: 5,114,884
[45] Date of Patent: May 19, 1992

[54] ALKALI BISMUTH GALLATE GLASSES

[75] Inventors: Josef C. Lapp, Corning; Mark L. Powley, Savona, both of N.Y.

[73] Assignee: Corning Incorporated, Corning, N.Y.

[21] Appl. No.: 691,843

[22] Filed: Apr. 26, 1991

[51] Int. Cl.$^5$ .......................... C03C 3/12; C03C 3/23; C03C 4/08
[52] U.S. Cl. ........................ 501/41; 501/43; 501/904
[58] Field of Search ............................ 501/41, 43, 904

[56] References Cited

U.S. PATENT DOCUMENTS 4,456,692  6/1984  Dumbaugh, Jr. et al. ............ 501/41
4,483,931  11/1984  Dumbaugh, Jr. et al. ............ 501/41

Primary Examiner—Mark L. Bell
Attorney, Agent, or Firm—C. S. Janes, Jr.

[57] ABSTRACT

This invention relates to the preparation of thermally stable, chemically durable, heavy metal oxide glasses exhibiting good transmission of infrared radiation to wavelengths of about 7 microns consisting essentially, in weight percent, of 7.5-25% $Ga_2O_3$, 70-92% $Bi_2O_3$, and 0.25-12% $R_2O$, wherein $R_2O$ consists of at least one alkali metal oxide selected from the group consisting of $Na_2O$ and $K_2O$.

4 Claims, 1 Drawing Sheet

ALKALI BISMUTH GALLATE GLASSES

BACKGROUND OF THE INVENTION

Glasses that are able to transmit light into the infrared region of the electromagnetic spectrum are well known in the art. U.S. Pat. No. 3,723,141 (W. H. Dumbaugh, Jr. et al.) provides a brief review of infrared transmitting Heavy Metal Oxide (HMO) glass compositions. One use for such glasses is as optical elements in commercial detection systems based on sensitivity to infrared radiation. Examples of such elements include windows, lenses, and telescopes used in the detection of thermal energy.

Because of atmospheric interferences which occur throughout the infrared region of the spectrum, optical engineers typically define two operating regimes which are differentiated on the basis of wavelength: the 3-5 micron regime and the 8-12 micron regime. The former region corresponds to the spectral radiant emittance of a relatively hot object such as engine exhaust. An example of an optical system operating in this region is the guidance system in a heat seeking missile. The latter region is employed by systems designed to detect objects at room temperature such as night vision devices.

Traditionally, glasses based on the oxides of silicon or germanium have been the materials of choice for use in the 3-5 micron range of the electromagnetic spectrum due to their relative ease of fabrication. However, these glasses have limited transmission in this region due to cutoffs that range from 4.5 to 5.5 microns. Consequently, significant degradation of the transmission at wavelengths as low as 4 microns is exhibited.

More exotic oxide glasses, such as those based on the oxides of aluminum or tellurium, have slightly better transmissions than the silicate or germanate glasses, but are hampered by poor chemical durabilities and processing complexities. The same can be said about the non-oxide glasses, such as the fluorides or non-oxide chalcogenides, which are known to have superior infrared transmitting abilities, but are hampered by the same shortcomings.

Stable, easily formed oxide glasses having the ability to transmit a high degree of light to wavelengths of 5 microns or more could be extremely useful in the applications described above, such as missile radomes, or in other optical components, such as space based lenses and mirrors. The glasses of the present invention are well suited for such uses.

Therefore, it is an object of this invention to provide a family of thermally stable, chemically durable, easily-formed alkali metal oxide glasses that exhibit good transmission in the 3-5 micron regime of the electromagnetic spectrum. It is a further object of this invention to show that said glasses exhibit good transmission to wavelengths of about 7 microns.

SUMMARY OF THE INVENTION

The present invention focusses on a family of HMO glass compositions based on $Bi_2O_3$, $Ga_2O_3$, and at least one of the alkali metal oxides selected from the group consisting of $Na_2O$ and $K_2O$. These glasses have the ability to transmit light into the infrared region of the spectrum to a wavelength of about 7 microns.

Said HMO glasses consist essentially, expressed in terms of weight percent on the oxide basis, of 70-92% $Bi_2O_3$, 7.5-25% $Ga_2O_3$, and 0.25-12% $R_2O$, where R is at least one alkali metal selected from the group consisting of Na and K, with the preferred compositions being in the range of 0.5-10% $R_2O$, 75-90% $Bi_2O_3$, and 10-22% $Ga_2O_3$. These latter compositions are quite resistant to devitrification, as is demonstrated in the instant invention by the synthesis of 100-200 gram samples using conventional glass melting and glass forming techniques. The presence of the other alkali metal oxides $Li_2O$, $Rb_2O$, and $Cs_2O$ in significant amounts leads to either a degradation in the ability to form glasses or to a decrease in the chemical durability of the glasses. Therefore, their inclusion will be limited, even when present in conjunction with $Na_2O$ and/or $K_2O$.

Many of these glasses display very good chemical durability, with no sign of weathering even after several months exposure to ambient conditions, even though none of the traditional glass forming oxides, such as silica, germania, or boron oxide, are employed.

Minor amounts of PbO or CdO may also be added, but the glass properties are not significantly affected thereby and the toxicity hazard inherent in their use discourages their inclusion.

Furthermore, when up to one-half of the alkali metal oxide batch material in these glasses is replaced with an alkali halide (preferably chloride), a significant reduction in the residual hydroxyl content of the glass results, causing an increase in the transmitting ability of the glass in the 3 micron region of the electromagnetic spectrum. A similar effect has been noted in other glass compositions in U.S. Pat. Nos. 3,531,271, 3,531,306, and 4,483,931. In addition, it will be appreciated that other methods of drying the glass, such as melting under a dry atmosphere as noted in U.S. Pat. No. 4,483,931, will be applicable to the glass compositions of the present invention.

PRIOR ART

A plethora of glass compositions are known to the art that have infrared transmitting characteristics. Included in such optical glass compositions are, for example, isotropic crystalline alkaline earth fluorides (U.S. Pat. No. 3,502,386), antimony sulfides (U.S. Pat. No. 3,002,842), germanium-arsenic-selenides/tellurides (U.S. Pat. No. 4,154,503), arsenic trisulfides (U.S. Pat. No. 2,979,382), and strontium and gallium compounds (U.S. Pat. No. 3,188,216), as well as methods for making infrared transmitting germanate glasses (U.S. Pat. No. 3,531,305). None of the glass compositions mentioned in these references coincides with those of the instant invention.

Oxides of tellurium, tungsten, tantalum, thallium, bismuth, barium, lead, and titanium were employed in synthesizing the optical glasses of U.S. Pat. No. 3,291,620, whereas at least two members from the group consisting of tungsten, molybdenum, bismuth, and arsenic and one member selected from the group of oxides and fluorides consisting of magnesium, calcium, strontium, barium, and lead, were utilized in U.S. Pat. No. 3,531,304. Neither reference mentions the use of alkalis or $Ga_2O_3$.

U.S. Pat. No. 3,723,141 (Dumbaugh, Jr.) is directed to the formation of infrared transmitting glasses consisting essentially, expressed in terms of weight percent on the oxide basis, of 10-85% $Bi_2O_3$, 10-75% PbO, $Bi_2O_3$+PbO>60%, 2-25% BaO, 1-10% ZnO, $SiO_2$+$B_2O_3$+$P_2O_5$<1%, and up to 20% total of the following components in amounts not exceeding 10% individually: CaO, SrO, CdO, HgO, $Tl_2O_3$, $TiO_2$, $GeO_2$, $Sb_2O_3$, As₂O₃, the transition metal oxides, and the alkali metal oxides. The stated reference does not mention the use of $Ga_2O_3$.

U.S. Pat. No. 3,837,867 (Dumbaugh, Jr.) is concerned with infrared transmitting glasses consisting essentially, expressed in terms of cation percent on the oxide basis, of 33-68% PbO, 2.5-27% CdO, 10-30% Fe₂O₃, and 4-28% Tl₂O. Those ranges correspond to the following approximate weight percentages: 40-80% PbO, 4-35% Tl₂O, 2-22% CdO, and 4-15% Fe₂O₃. The stated reference does not mention the use of alkali metal oxides nor $Ga_2O_3$.

U.S. Pat. No. 4,456,692 (Dumbaugh, Jr. et al.) discloses lead-free glasses consisting essentially, expressed in terms of weight percent on the oxide basis, of 40-90% Bi₂O₃, 5-30% Ga₂O₃, 0-35% CdO (the preferred glasses contain 4-28% CdO), up to 3% chlorine, and up to 30% total of the following oxides in the indicated proportions of 0-10% Cs₂O, 0-25% HgO, 0-3% GeO₂, and 0-4% Sb₂O₃. The patentees nowhere suggest the use of Na₂O and/or K₂O in their glasses and, although mentioning Cs₂O as a possible optional ingredient, they did not provide a working example of such a composition.

In U.S. Pat. No. 4,483,931 W. H. Dumbaugh, Jr. et al. provide a brief review of the prior art relating to infrared transmitting glass compositions. In particular, this patent discloses glasses consisting essentially, expressed in terms of weight percent on the oxide basis, of 10-85% PbO, 5-30% Ga₂O₃, 0-85% Bi₂O₃, and up to 30% total of the following components in the indicated proportions of:

| | | | | | |
|---|---|---|---|---|---|
| CS₂O | 0-20 | ZnO | 0-5 | Na₂O | 0-2 |
| HgO | 0-30 | K₂O | 0-2 | In₂O₃ | 0-10 |
| Tl₂O | 0-20 | Cr₂O₃ | 0-5 | SiO₂ | 0-2 |
| Sb₂O₃ | 0-10 | MnO₂ | 0-5 | ZrO₂ | 0-5 |
| TeO₂ | 0-10 | CuO | 0-2 | Nb₂O₅ | 0-5 |
| Tb₂O₃ | 0-5 | CdO | 0-12 | Ta₂O₅ | 0-5 |
| HfO₂ | 0-5 | GeO₂ | 0-5 | Halogen | 0-5 |
| Al₂O₃ | 0-3 | | | | |

Glass compositions claimed in this patent are shown to be capable of transmitting light to a wavelength of 8 microns. PbO is expressly mentioned in the stated reference, whereas it is absent from the compositional regimes of the instant invention. Furthermore, Na₂O and K₂O are optional ingredients only and then only in small amounts. Bi₂O₃ is likewise an optional ingredient only.

In addition, the physical and optical properties of the glasses of the instant invention also differ from those lead-bismuth-gallate glasses patented by W. H. Dumbaugh Jr, et al. The glasses of the instant invention exhibit: superior thermal properties, i.e., a higher strain point and a lower thermal expansion coefficient, which lead to a better high temperature performance; a lower density, which leads to lighter weight parts; lower refractive indices, which lead to lower reflective losses; and, an expanded range of optical characteristics, which give the optical engineer a wider range of applications for the glasses.

U.S. Pat. No. 3,837,868 (Berleue et al.) describes infrared transmitting glasses consisting essentially, expressed in terms of cation percent on the oxide basis, of 8-80% Bi₂O₃, 0-57% PbO, 0-32% CdO, at least 5% PbO-CdO, 5-32.5% Fe₂O₃, and 0-15% other compatible glassmaking constituents. The stated reference does not mention the use of alkali metal oxides or $Ga_2O_3$.

French Pat. No. 1,549,090 discloses a number of germanate glasses that are transparent to infrared rays. Said glasses are summarized as follows;

| Glass # | GeO₂ (mol %) | Tl₂O₃ (mol %) | Bi₂O₃ (mol %) | PbO (mol %) | PbF₂ (mol %) | As₂O₃ (mol %) |
|---|---|---|---|---|---|---|
| 1 | 53.3 | 47.7 | — | — | — | — |
| 2 | 65.3 | 34.7 | — | — | — | — |
| 3 | 74.5 | 25.5 | — | — | — | — |
| 4 | 81.3 | 18.7 | — | — | — | — |
| 5 | 71.1 | — | 28.9 | — | — | — |
| 6 | 58.4 | — | 19.3 | 19.3 | — | — |
| 7 | 59.3 | — | 22.7 | — | 18.0 | — |
| 8 | 26.8 | 26.8 | 26.8 | 19.6 | — | — |
| 9 | 9.3 | 20.5 | 22.8 | 47.4 | — | — |
| 10 | 28.6 | 14.2 | 28.6 | 28.6 | — | — |
| 11 | 28.7 | 19.1 | 28.0 | 24.2 | — | — |
| 12 | 54.6 | 9.1 | 18.1 | 18.2 | — | — |
| 13 | 18.1 | 29.0 | 26.8 | — | 31.0 | — |
| 14 | 14.8 | 19.8 | 28.0 | 18.0 | 25.4 | — |
| 15 | 66.6 | 16.7 | 16.7 | — | — | — |
| 16 | 11.1 | 16.6 | 18.6 | 39.2 | — | 14.5 |

Neither alkali metal oxides nor Ga₂O₃ is mentioned in the patent.

In the article entitled "Glass Formation and Optical Properties or Glasses in the Systems (R₂O or R'O)—Ta₂O₅—Ga₂O₃" authored by T. Kokubo, Y. Inaka, and S. Sakka [*Journal of Non-Crystalline Solids*, 80, pages 518-526, (1986)], gallate glasses were obtained without the employment of conventional glass formers. Kokubo et al. focussed on the (Na₂O, K₂O, or Cs₂O)—Ta₂O₅—Ga₂O₃ system wherein glasses exhibiting high optical transmission in the infrared as well as in the visible region, were synthesized.

Kokubo et al. conducted further experiments on the glass forming tendencies of melts in the alkali oxide/alkaline earth oxide—Nb₂O₃—Ga₂O₃ system, and published their results in the *Journal of Non-Crystalline Solids* [v. 81, pages 337-350, (1986)] in an article entitled "Formation and Optical Properties of (R₂O or R'O)—Nb₂O₅—Ga₂O₃ Glasses". The crucible melting technique was used in developing glasses in the aforementioned system, as well as the (K₂O or Cs₂O)—Nb₂O₅—Ga₂O₃ and (SrO or BaO)—Nb₂O₅—Ga₂O₃ systems.

In 1987, Kokubo et al. published yet another article in the *Journal of Non-Crystalline Solids* [v. 95 & 96, pages 547-554] entitled "Formation and Optical Properties of (R₂O or R'O)—TiO₂—Ga₂O₃ Glasses" which disclosed the development of glasses in the (Na₂O, K₂O, or Cs₂O)—TiO₂—Ga₂O₃ and (CaO, SrO, or BaO)—TiO₂—Ga₂O₃ systems by conventional crucible-melting techniques without the use of conventional glass formers.

The aforementioned articles published by Kokubo et al. report on the formation of glasses in the title systems. No mention was made of bismuth oxide. Further, to achieve glass formation, the authors found it necessary to cool the melt very quickly by quenching it between two steel plates, a processing method not necessary for the compositions of the present invention.

A. M. Glass and K. Nassau, "Lithium Ion Conduction in Rapidly Quenched Li₂O—Al₂O₃, Li₂O—Ga₂O₃, and Li₂O—Bi₂O₃ Glasses", *Journal of Applied Physics*, 51 [7], pages 3756-3761, (1980), report glass formation in the title binary compositions as well as ternary mixed systems. A rapid quenching technique using a twin roller apparatus was necessarily employed to prepare the melts as glasses, thereby resulting in the formation of thin (20 μm) flakes of glass. The article was primarily concerned with the crystallization of these rapidly quenched glasses as well as with their electrical behavior. No mention was made of glass compositions containing other alkali metals.

DESCRIPTION OF PREFERRED EMBODIMENTS

Figure 1:
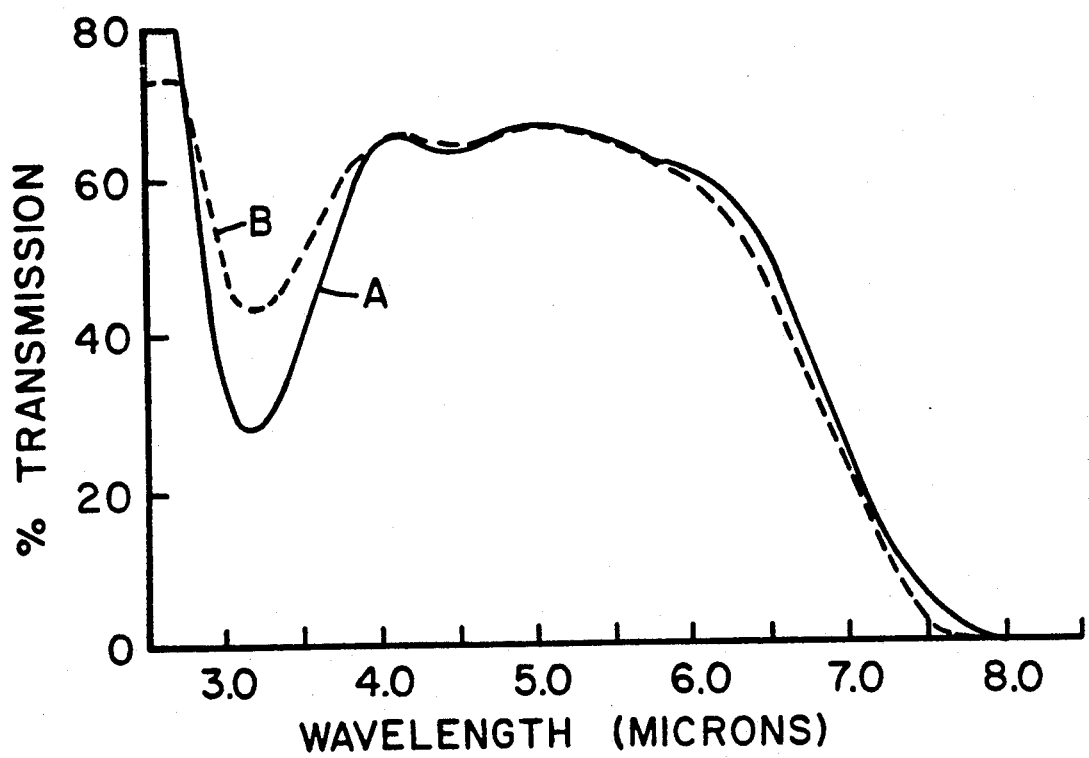
FIGS. 1 and 2 graphically illustrate the infrared transmitting ability of several compositions representative of the present invention over the wavelength range of 2 to 8 microns.

The basic embodiment of the instant invention comprises glass compositions encompassed within the $R_2O$—$Ga_2O_3$—$Bi_2O_3$ ternary system consisting essentially, expressed in terms of weight percent on the oxide basis, of 70-92% $Bi_2O_3$, 7.5-25% $Ga_2O_3$, and 0.25-12% $R_2O$, where R is at least one alkali metal selected from the group consisting of Na and K.

While it is clear that the alkali. metal oxide glasses of the present invention exhibit good transmission in the infrared region of the electromagnetic spectrum, it is expected that said glasses exhibit good optical non-linearity, low optical loss, and fast response time, making them useful in many active optical devices.

The glass forming region covered in the present invention may be outlined using a process known as strip melting which involves weighing the requisite amounts of raw materials to yield one gram of glass. In this instance bismuth oxide, gallium oxide, and the appropriate alkali carbonate were used; however, it will be appreciated that other raw materials, capable of being converted into the requisite oxide components of the glass through the melting process, are also applicable. The batch was then mixed using a Turbula ® mixer. The batch was melted on a resistance heated platinum strip by placing it into a depression formed in a 1"×3" platinum strip and manually raising the current until all raw material had melted. The current was then discontinued and the melt allowed to cool to room temperature. The melts were visually designated as good (no sign of unmelted batch or devitrification), fair (a minor amount of batch or devitrification), and poor (less than 50% glass). Those melts designated as good were used to determine the glass forming region of the present invention.

Compositions demonstrating superior glass forming ability and good thermal stability constitute the basis of the preferred compositions of the present invention and were melted on a larger, 100-200 gram scale. Appropriate batches were prepared as described above and were melted in platinum crucibles at approximately 1200° C. for 30 minutes. The melts were cast into stainless steel molds, allowed to cool to room temperature, and subsequently annealed. Tables I and IA record the compositions of several of these examples on a weight % and mole % basis of the batched raw materials, respectively. Chemical analyses of several compositions by techniques standard in the art indicate that the analyzed composition is within 5% of the batched composition on a weight % basis. In Example 5, one-half of the sodium oxide component of the glass was batched using sodium chloride.

TABLE I

| Glass Compositions on Basis of Weight Percent | | | | |
|---|---|---|---|---|
| | $Ga_2O_3$ | $Bi_2O_3$ | $Na_2O$ | $K_2O$ | Cl |
| 01 | 10.1 | 88.2 | 1.7 | — | — |
| 02 | 12.5 | 86.7 | 0.8 | — | — |
| 03 | 13.6 | 86.0 | 0.4 | — | — |
| 04 | 13.2 | 85.1 | 1.7 | — | — |
| 05 | 12.4 | 86.3 | 0.8 | — | 0.5 |
| 06 | 9.6 | 89.2 | — | 1.2 | — |
| 07 | 10.7 | 88.7 | — | 0.6 | — |
| 08 | 10.0 | 87.4 | — | 2.5 | — |
| 09 | 12.4 | 86.3 | — | 1.2 | — |
| 10 | 13.6 | 85.8 | — | 0.6 | — |
| 11 | 10.6 | 85.4 | — | 4.0 | — |
| 12 | 13.0 | 84.3 | — | 2.6 | — |
| 13 | 15.5 | 83.2 | — | 1.3 | — |
| 14 | 11.2 | 83.2 | — | 5.6 | — |
| 15 | 13.8 | 82.1 | — | 4.2 | — |
| 16 | 16.3 | 81.0 | — | 2.7 | — |
| 17 | 18.7 | 79.9 | — | 1.4 | — |
| 18 | 19.8 | 77.3 | — | 2.8 | — |
| 19 | 17.2 | 78.4 | — | 4.3 | — |
| 20 | 14.5 | 79.6 | — | 5.8 | — |
| 21 | 11.8 | 80.7 | — | 7.4 | — |
| 22 | 21.0 | 74.5 | — | 4.5 | — |
| 23 | 18.2 | 75.6 | — | 6.1 | — |
| 24 | 15.4 | 76.8 | — | 7.8 | — |

TABLE IA

| Glass Compositions on Basis of Mole Percent | | | | |
|---|---|---|---|---|
| | $Ga_2O_3$ | $Bi_2O_3$ | $Na_2O$ | $K_2O$ | Cl |
| 01 | 20.0 | 70.0 | 10.0 | — | — |
| 02 | 25.5 | 70.0 | 5.0 | — | — |
| 03 | 27.5 | 70.0 | 2.5 | — | — |
| 04 | 25.0 | 65.0 | 10.0 | — | — |
| 05 | 23.8 | 66.5 | 4.6 | — | 5.1 |
| 06 | 20.0 | 75.0 | — | 5.0 | — |
| 07 | 22.5 | 75.0 | — | 2.5 | — |
| 08 | 20.0 | 70.0 | — | 10.0 | — |
| 09 | 25.0 | 70.0 | — | 5.0 | — |
| 10 | 27.5 | 70.0 | — | 2.5 | — |
| 11 | 20.0 | 65.0 | — | 15.0 | — |
| 12 | 25.0 | 65.0 | — | 10.0 | — |
| 13 | 30.0 | 65.0 | — | 5.0 | — |
| 14 | 20.0 | 60.0 | — | 20.0 | — |
| 15 | 25.0 | 60.0 | — | 15.0 | — |
| 16 | 30.0 | 60.0 | — | 10.0 | — |
| 17 | 35.0 | 60.0 | — | 5.0 | — |
| 18 | 35.0 | 55.0 | — | 10.0 | — |
| 19 | 30.0 | 55.0 | — | 15.0 | — |
| 20 | 25.0 | 55.0 | — | 20.0 | — |
| 21 | 20.0 | 55.0 | — | 25.0 | — |
| 22 | 35.0 | 50.0 | — | 15.0 | — |
| 23 | 30.0 | 50.0 | — | 20.0 | — |
| 24 | 25.0 | 50.0 | — | 25.0 | — |

Table II records some of the physical properties of these glasses measured using techniques conventional in the glass art. Included is the annealing point (Ann. Pt.), strain point (Str. Pt.), coefficient of thermal expansion (C.T.E.) over the range 25°-300° C. in terms of x10-7/° C., density (Dens.), point of 50% infrared transmission (IR) normalized for a 2 mm thick piece, logarithm of D.C. electrical resistivity (Log$\rho$) at 250° C., activation energy for D.C. electrical resistivity (E.R.), the dielectric constant (K') and dissipation factor (D.F.) at a frequency of 1 KHz and room temperature, and the durability (Dur) measured in terms of weight loss per surface area after immersion in deionized water for 9 hours at 95° C.

TABLE II

| | 2 | 9 | 13 | 15 |
|---|---|---|---|---|
| Ann. Pt. (C) | 345 | 344 | 361 | 333 |
| Str. Pt. (C) | 329 | 329 | 346 | 317 |

TABLE II-continued

| | 2 | 9 | 13 | 15 |
|---|---|---|---|---|
| C.T.E. | 112.8 | 114.8 | 108.5 | 130.0 |
| Dens. (gm/cc) | 8.056 | 7.93 | 7.794 | 7.207 |
| IR ($\mu$m) | 6.69 | 6.80 | 6.75 | 6.58 |
| Log$\rho$ (ohm-cm) | 7.97 | 7.93 | 8.21 | 8.81 |
| E.R. (kcal/mol) | 25.6 | 25.75 | 26.47 | 26.36 |
| K' | 32.56 | 30.12 | 34.89 | 23.07 |
| D.F. | 0.0027 | 0.0030 | 0.0047 | 0.0028 |
| Dur. (mg/cm$^2$) | −0.28 | −0.51 | −0.19 | −0.30 |

The infrared transmitting ability of two of these new glass compositions is illustrated in FIG. 1, as recorded by a Nicolet FTIR Model 7000 series spectrophotometer on samples 2 mm thick. In this Figure, Curve A corresponds to Example 2 and Curve B corresponds to Example 13. In general, these glasses transmit greater than 60% of the incident radiation at a wavelength less than or approximately 6 microns. The decrease in transmission at approximately 3 microns is due to residual hydroxyl ions in the glass.

Figure 2:
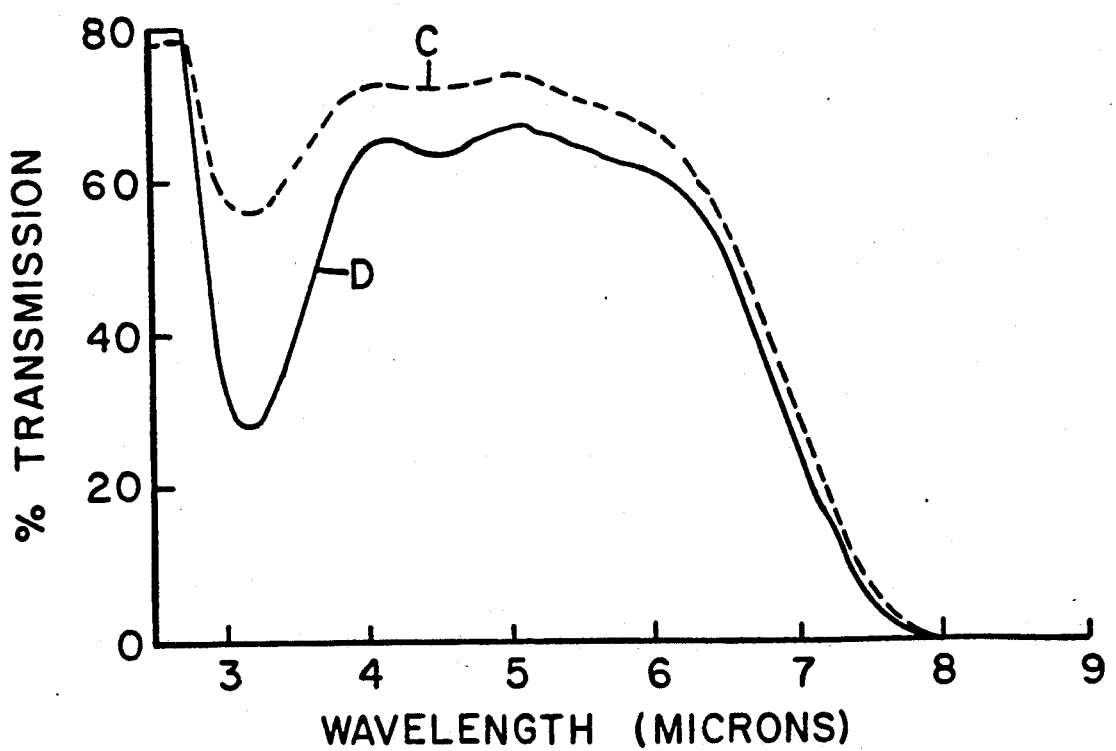

FIG. 2 illustrates the infrared transmission of Examples 5 and 2 (Curves C and D, respectively). These were recorded in the same manner as FIG. 1. Curve C illustrates the dramatic effect batching a halogen-containing raw material has on the 3 micron absorption band. Further efforts known in the art to dry the glass, such as melting under a dry atmosphere, can be expected to result in a further reduction in the intensity of this absorption band.

While the principles of the instant invention have been described in connection with specific embodiments and particular modifications thereof, it is to be clearly understood that this description is made only by way of example, and not as a limitation on the scope of the invention. Said principles may be otherwise embodied within the scope of the following claims.

We claim:

1. Thermally stable, chemically durable, heavy metal oxide glasses exhibiting good transmission of infrared radiation to wavelengths of about 7 microns, consisting essentially, expressed in terms of weight per cent on the oxide basis, of 7.5–25% $Ga_2O_3$, 70–92% $Bi_2O_3$, and 0.25–12% $R_2O$, wherein $R_2O$ consists of at least one alkali metal oxide selected from the group consisting of $Na_2O$, and $K_2O$.

2. The heavy metal oxide glasses according to claim 1 consisting essentially of 0.5–10% $R_2O$, 10–22% $Ga_2O_3$, and 75–90% $Bi_2O_3$.

3. The heavy metal oxide glasses according to claim 1 wherein up to 50% of the $R_2O$ is replaced with an alkali metal halide.

4. The heavy metal oxide glasses according to claim 3 wherein said halide is chloride.

* * * * *